Jan. 24, 1961 W. E. BUCK 2,968,989
HIGH SPEED CONTINUOUS WRITING FRAMING CAMERA
Filed Aug. 4, 1958 2 Sheets-Sheet 2

INVENTOR.
WILLIARD E. BUCK
BY
ATTORNEYS

United States Patent Office 2,968,989
Patented Jan. 24, 1961

---

2,968,989

HIGH SPEED CONTINUOUS WRITING FRAMING CAMERA

Willard E. Buck, Boulder, Colo., assignor to Beckman & Whitley, Inc., San Carlos, Calif., a corporation of California Filed Aug. 4, 1958, Ser. No. 752,833

5 Claims. (Cl. 88—16)

This invention relates to high speed framing cameras of the continuous writing type.

One well known method of high speed photography is that in which an image of an event to be recorded is focused upon a rotating mirror which reflects the image through further optical elements on to an arcuately supported film, the center of the arc of the film support being the point at which the image appears on the mirror. Due to rotation of the mirror the focused beam or so-called "bundle" of light rays is swept across the film to expose it or to "write" from end to end of the film. It is apparent, therefore, that a single plane face of a rotating mirror can direct a beam or write only through a limited arc. This limits the total time of exposure for recording purposes and also imposes finite starting and stopping times. Thus the event to be recorded, if not a continuous one, must be started or triggered precisely, since the entire recording time of the camera is a matter of a few micro-seconds.

Attempts have been made to create a longer writing time by employing a multi-face rotating mirror and two or more arcuately disposed film strips in opposed positions to write first on one and then on the other using separate faces of the mirror. Even cameras of this type have been unable to write continuously, but have what is known as "blind time" between the exposure of the two film strips. Other attempts have been made to split the light beam originating from the event or object to be recorded, but this also divides the quantity or intensity of light available for exposure of the film.

A framing camera, as the term is employed herein, is one of the type hereinabove referred to wherein a series of lenses and stops is arranged adjacent the film in a manner to interrupt the sweeping bundle of light rays and produce a sequence of exposure separated in time and in space on the film strip.

It is an object of the present invention to provide a continuous writing, framing camera comprising more than one film strip in which the time of recording on one strip overlaps by at least one frame the time of recording on the next strip so as to eliminate blind time at any period during an operating cycle of the camera.

A further object of the invention is to provide a camera of the kind described in which light from an event to be recorded enters and is split into diverging optical paths without loss of effective intensity at the film resulting from the splitting thereof.

Another object of the invention is the provision of a camera in which separate optical paths are directed at a rotating mirror for reflection thereby to separate diametrically opposed film strips without permitting light from one path to enter the opposite film area nor impinging upon the optical elements associated with said area.

Further and more specific objects and advantages of the invention and the manner in which the invention is carried into practice are made apparent in the following specification wherein reference is made to the accompanying drawings.

Figure 1:
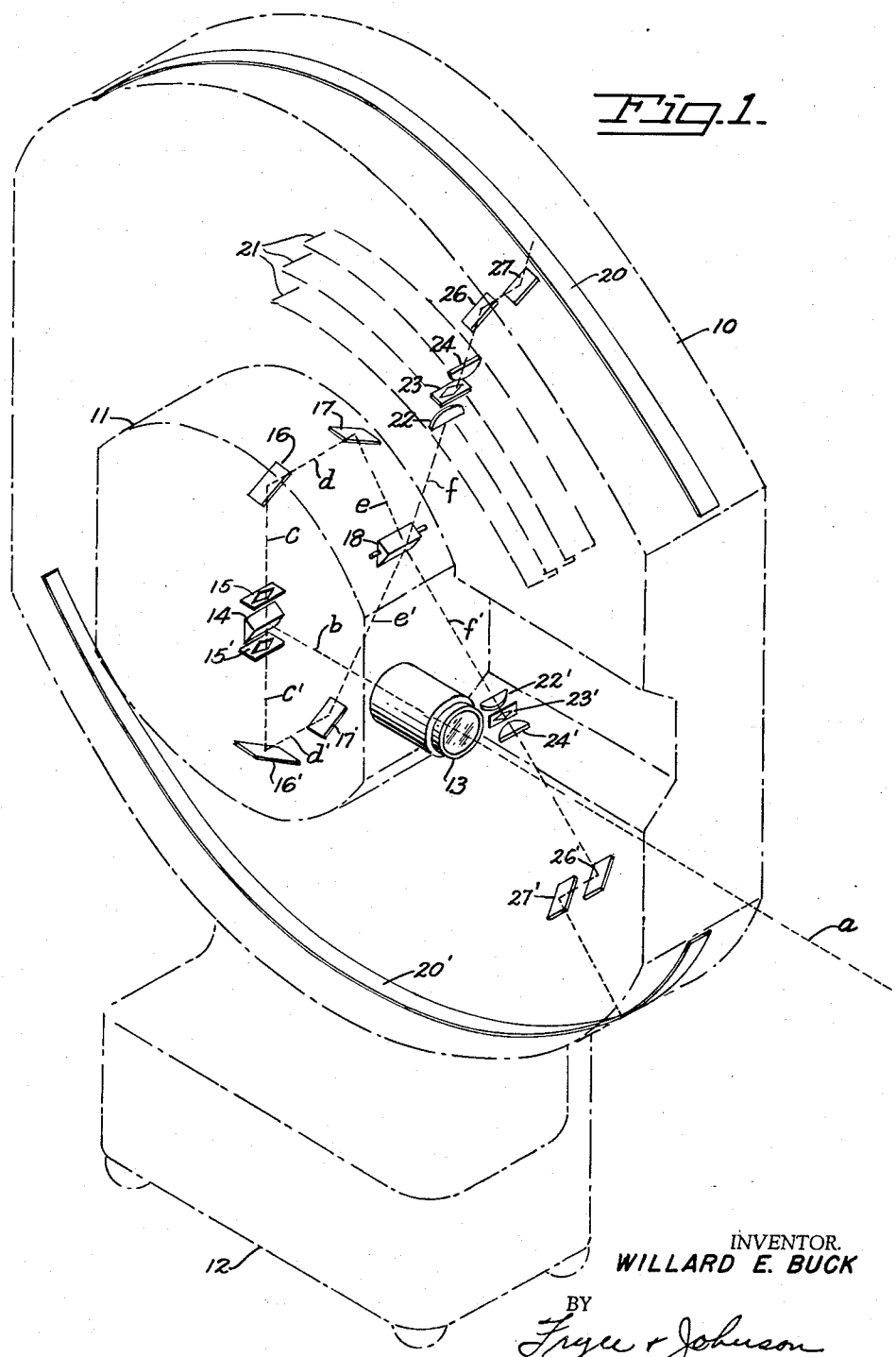
Fig. 1 is a schematic view in perspective showing the base and housing of a camera constructed in accordance with the present invention in broken lines and illustrating the relative positions of the principal optical elements thereof in full lines, dotted lines being employed to indicate paths followed by the light beams in their courses from the objective lens to the film strips.
Figure 2:
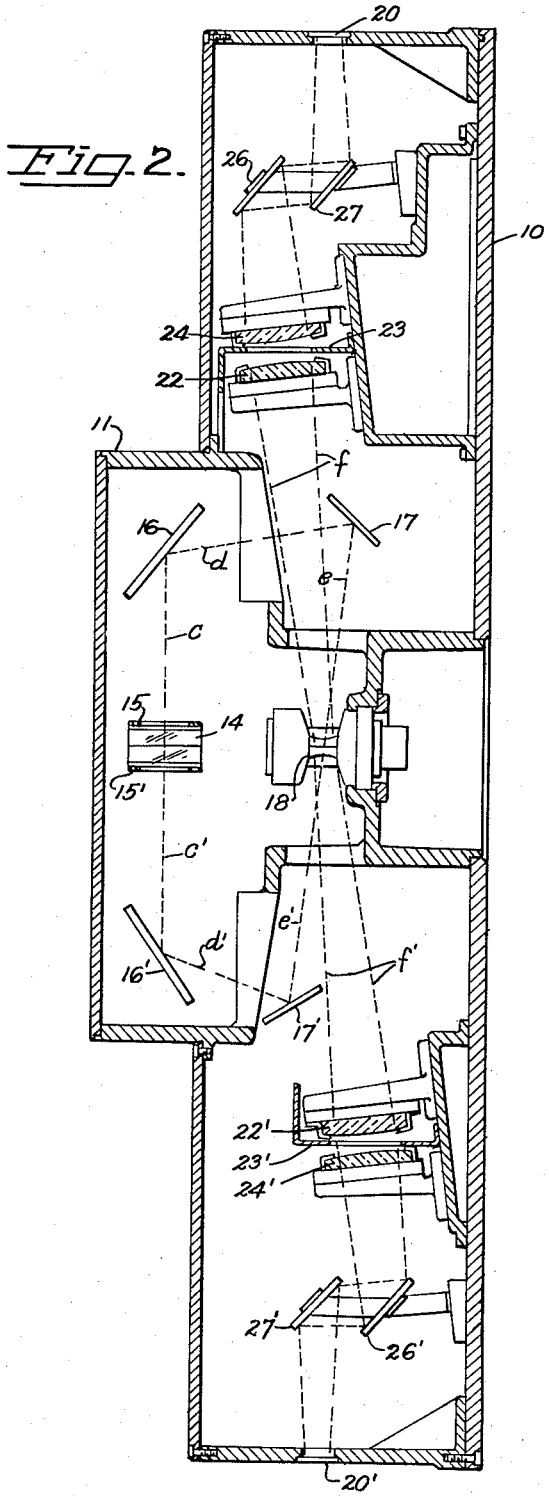
Fig. 2 is a central vertical transverse section through the camera housing of Fig. 1.

The camera shown in Figs. 1 and 2 comprises a generally cylindrical main housing 10 with a smaller similarly shaped and coaxially disposed auxiliary housing 11 carried at one side thereof both supported as illustrated in Fig. 1 on a base 12. Light from an event to be recorded follows a path indicated by the dotted line $a$ and is admitted to the camera through a single long focus achromat lens illustrated at 13. Directly behind this lens and carried in its housing are a capping shutter and a focusing reticle but the structure of these elements may be conventional and since they do not form a part of the present invention, they are not herein illustrated. When the capping shutter is open, the focused beam from the objective lens 13 enters the camera along the path $b$ and impinges upon a first surface silvered triangular mirror 14. The apex of the triangular mirror is centrally disposed with respect to the beam so that the beam impinges two angularly related converging surfaces. Thus the mirror splits the focused beam from the objective lens into two oppositely directed beams substantially at right angles to the incoming path $b$ forming two light beams $c$ and $c'$. This method of splitting the incoming beam differs from other conventional methods in that each of the split portions of the original beam is of intensity equal to the original beam rather than of greatly reduced intensity as where the original beam is divided by semi-reflective surfaces or other means. The beams $c$ and $c'$ pass through masks or entrance stops 15 and 15' with diamond shaped openings spaced as best illustrated in Fig. 2 closely adjacent the splitting mirror 14. The separate beams impinge upon mirrors 16 and 16' and are directed thereby along paths $d$ and $d'$ to mirrors 17 and 17' from which they in turn flow along paths $e$ and $e'$ to impinge from opposite directions upon a turbine driven rotating triangular mirror 18.

All of the optical elements from the entrance stops 15 and 15' to the film planes 20 and 20' subsequently to be described are centered on the optical axis of the entrance stop and the relay mirrors 16 and 16'. Mirrors 17 and 17' route the split light beams to impinge upon the triangular rotating mirror from substantially opposite directions in one plane but at an angle of 7°, as is most readily apparent from Fig. 2, off of the plane perpendicular to the rotational axis of the rotating mirror so that one of the two beams approaches the mirror at an angle of 7° from one side of the center while the other beam approaches it at an angle of 7° from the other side of the center. This enables the projection of the beams toward oppositely disposed film tracks and through further optical elements without the possibility of stray light from either side impinging upon the optical elements or film at the opposite side.

The beams of light in the paths $e$ and $e'$ are swept alternately along paths $f$ and $f'$ toward oppositely arranged arcuate film supports 20 and 20' in which film to be exposed is stationarily supported. Each of the segments occupied by the film is approximately 120° of a circle, the axis of which is approximately the center of the rotating mirror 18. In each 120° segment there are arranged forty-one sets of relay lenses, routing mirrors and stops to effect forty-one exposures on each film strip and, since the first and last exposures or frames on each strip is positioned to overlap that of the other strip, the camera is considered to be an eighty frame camera which is continuous writing or free of blind time because of this arrangement.

The beams $f$ and $f'$ which carry the image produced on the faces of the rotating mirror 18 are swept over sets of optical elements, there being two such sets arranged in arcuate paths such as represented by the dotted lines at 21 in Fig. 1 and each set comprises as shown in Figs. 1 and 2 a first relay lens 22 spaced precisely its focal length from the face of the rotating mirror and producing a collimated beam. It should be understood that the beams $f$ and $f'$ do not occur at once but sweep across the film on the supports 20 and 20' in succession as the mirror 18 rotates. Their illustration in Fig. 1 represents positions which they would occupy at two different positions of the mirror. Directly behind the first relay lens 22 is an exit stop 23 with a diamond shaped opening corresponding closely to the configuration of the opening in the entrance stops 15 and 15'. A second relay lens 24 on precisely the same center line as the first relay lens and exit stop picks up and refocuses the collimated light coming through the diamond shaped opening to produce an image at its focal length which is the distance to the surface of the film in the support 20. Since the axis of the beam passing through the relay lenses is inclined from the axis of the rotating mirror 7°, it is returned to a position perpendicular to the axis of the rotating mirror by a pair of mirrors 26 and 27 which direct it to the surface of the film. Thus the image is placed flat on the cylindrically supported film surface which is parallel to the axis of rotation of the rotating mirror and disposed in an arc substantially concentric to said axis.

Figure 3:
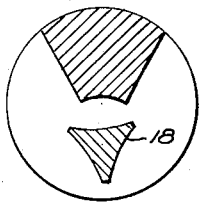
Fig. 3 is an enlarged schematic section through the rotating mirror and turbine of Fig. 2 taken in a plane normal to the axis of rotation of the mirror.

The reflecting faces of the rotating mirror 18 are ground spherically to a radius chosen to cause the face of the mirror to act as a lens relative to the entrance and exit stops but since the image entering through the objective lens is formed upon the face of this mirror, the spherical radius of its reflecting surfaces, shown in exaggeration in Fig. 3, has little or no effect upon the quality of the image or upon the primary optics. This spherical radius of the mirror is chosen so that the outline of the entrance stop and the bundle of light coming through is reflected at the mirror and focused by the spherical surface in sharp detail at the exit stop location between the relay lenses 22 and 24.

Shuttering is accomplished by sweeping the diamond shaped opening in the exit stop. The diamond shaped entrance and exit stops, though not original with this invention, are chosen because of their extremely efficient shuttering effect. That is, the rise to peak energy through the opening during the time of overlap of the image and the opening is very sharp, as is also the decay time. Actual effectual shuttering time, that is the time when 95 percent of the admitted light to a particular frame is admitted is approximately ¼ of the overlap time between the sweeping light bundle and the diamond shaped opening of the exit stop.

The set of optical elements represented by the relay lenses 22, 24, the stop 23 and the mirrors 26 and 27, of which there are 41 each of the separate pieces, is of course duplicated for the opposite film strip 20' and are represented by the same numbers primed in the lower portion of Fig. 2. Throughout the drawing, the supports for the optical elements are shown only in part and not specifically described as they are dictated by expediency and are not critical to an understanding of the invention. It may be seen from Fig. 2, however, that their arrangement is such that the 7° deflection from normal of the angles of incidence and reflection at the mirror 18 directs the light reflected by the mirror away from the opposed optical elements to avoid undesired exposure of the oppositely disposed film strips.

I claim:

1. In a camera of the character described in which a beam of light from an objective lens is split into diverging paths to be directed toward films in different positions, beam splitting means comprising two angularly related mirror surfaces terminating in a line perpendicular to and intersecting the light beam axis shuttering masks disposed in the paths of the beams reflected by the mirror surfaces whereby light passing through each mask will be substantially equal in intensity to the beam from the objective lens and a single three-face rotating mirror intercepting both paths to create separate beams sweeping across separate films in immediate succession.

2. A continuous writing framing camera comprising two arcuate film supports arranged in opposition with respect to a common center, a single mirror having at least three separate reflecting faces rotatable about an axis coincident with said center, means to direct separate beams of light containing images of a single object toward said mirror from diametrically opposite directions and in planes angularly and oppositely related to a plane normal to the axis of the mirror, and means to direct the corresponding reflected beams to said film supports.

3. A continuous writing framing camera comprising two arcuate film supports arranged in opposition with respect to a common center, a single mirror having at least three separate reflecting faces rotatable about an axis coincident with said center, means to direct separate beams of light containing images of a single object toward said mirror from diametrically opposite directions and in planes angularly and oppositely related to a plane normal to the axis of the mirror, and means to direct the corresponding reflected beams to said film supports, said last named means comprising relay lenses arranged with optical center lines coincident with the center lines of said reflected beams, and mirrors for directing the beams from the relay lenses toward the film supports in a plane normal to the axis of the rotating mirror.

4. A continuous writing framing camera comprising two arcuate film supports arranged in opposition with respect to a common center, a single mirror having at least three separate reflecting faces rotatable about an axis coincident with said center, means to direct separate beams of light containing images of a single event toward said mirror from diametrically opposite directions and in planes angularly and oppositely related to a plane normal to the axis of the mirror, and means to direct the corresponding reflected beams to said film supports alternately from different faces of the mirror as it rotates in immediate succession to record a continuous succession of exposures of said event upon film arranged on said supports.

5. A continuous writing framing camera comprising two arcuate film supports arranged in opposition with respect to a common center, a single mirror having at least three separate reflecting faces rotatable about said center, an objective lens, a beam splitting device in alignment with the objective lens, entrance stops with framing openings in the paths of the beams from the splitting device, means to direct said beams from opposite directions toward the rotatable mirror, means including a plurality of spaced sets of relay lenses before each of said arcuate film supports to focus the beams swept by the mirror on the surface of film in said supports and exit stops with framing openings between said sets of relay lenses to effect exposure of the film to the beams at timed and spaced intervals.

(References on following page)

References Cited in the file of this patent

UNITED STATES PATENTS

| | | |
|---|---|---|
| 2,400,887 | Miller | May 28, 1946 |
| 2,668,473 | Brixner | Feb. 9, 1954 |
| 2,687,062 | Baird | Aug. 24, 1954 |
| 2,822,721 | Parker et al. | Feb. 11, 1958 |

FOREIGN PATENTS

| | | |
|---|---|---|
| 174,622 | Great Britain | June 25, 1923 |
| 790,832 | Great Britain | Feb. 19, 1958 |

UNITED STATES PATENT OFFICE
CERTIFICATION OF CORRECTION

Patent No. 2,968,989 January 24, 1961

Willard E. Buck

It is hereby certified that error appears in the above numbered patent requiring correction and that the said Letters Patent should read as corrected below.

Column 1, lines 66 and 67, for "impinging" read -- impinge --; column 3, line 55, after "shaped", first occurrence, insert -- beam, which is the image of the entrance stop full of light, past the diamond shaped --.

Signed and sealed this 13th day of June 1961.

(SEAL)
Attest:

ERNEST W. SWIDER
Attesting Officer

DAVID L. LADD
Commissioner of Patents